(12) United States Patent
Takatsuki

(10) Patent No.: US 6,809,882 B2
(45) Date of Patent: Oct. 26, 2004

(54) WIDE-ANGLE ZOOM LENS

(75) Inventor: Akiko Takatsuki, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/390,635

(22) Filed: Mar. 19, 2003

(65) Prior Publication Data

US 2003/0179466 A1 Sep. 25, 2003

Related U.S. Application Data

(63) Continuation-in-part of application No. 10/073,252, filed on Feb. 13, 2002, now abandoned.

(30) Foreign Application Priority Data

Mar. 15, 2001 (JP) ........................................ 2001-074459

(51) Int. Cl.[7] .............................................. G02B 15/14
(52) U.S. Cl. ........................ 359/691; 359/686; 359/689
(58) Field of Search ........................... 359/676, 686–692

(56) References Cited

U.S. PATENT DOCUMENTS 4,484,799 A * 11/1984 Doi et al. .................... 359/681
4,540,249 A * 9/1985 Mogami ...................... 359/680

FOREIGN PATENT DOCUMENTS

| JP | 9-171139 | 6/1997 |
| JP | 11-344670 | 12/1999 |

* cited by examiner

Primary Examiner—Georgia Epps
Assistant Examiner—William Choi
(74) Attorney, Agent, or Firm—Arnold International; Bruce Y. Arnold

(57) ABSTRACT

A wide-angle zoom lens is disclosed having only two lens groups, of negative and positive refractive power in order from the object side, respectively, and which provides an image angle at the wide-angle end of at least 100°. Zooming is performed by moving the first lens group and the second lens group along the optical axis. The first lens group is formed of, in sequential order from the object side, a negative meniscus lens element with its convex surface on the object side, two negative lens elements, and a positive lens element. The second lens group is formed of, in sequential order from the object side, two positive lens elements, a biconcave lens element, and two positive lens elements. Various conditions are preferably satisfied so as to minimize aberrations and make the zoom lens compact and easy to manufacture.

7 Claims, 5 Drawing Sheets f=2.29

Spherical Aberration

Astigmatism

Distortion f=3.43

Spherical Aberration

Astigmatism

Distortion f=4.58

Spherical Aberration

Astigmatism

Distortion f=2.24

Spherical Aberration

Astigmatism

Distortion f=3.36

Spherical Aberration

Astigmatism

Distortion f=4.48

Spherical Aberration

Astigmatism

Distortion f=2.29

Spherical Aberration

Astigmatism

Distortion f=3.44

Spherical Aberration

Astigmatism

Distortion f=4.59

Spherical Aberration

Astigmatism

Distortion f=2.23

Spherical Aberration

Astigmatism

Distortion f=3.34

Spherical Aberration

Astigmatism

Distortion f=4.46

Spherical Aberration

Astigmatism

Distortion

WIDE-ANGLE ZOOM LENS

CROSS REFERENCE TO RELATED APPLICATION

This application is a continuation-in-part of U.S. patent application Ser. No. 10/073,252, filed Feb. 13, 2002, now abandoned, the benefit of which is hereby claimed under 35 U.S.C. §120.

BACKGROUND OF THE INVENTION

In general, in designing a zoom lens, providing a negative refractive power to the object-side lens group has the benefit that a wide-angle of view is facilitated while also providing a long back focus for the insertion of necessary optical components between the zoom lens and the image plane. On the other hand, especially in a two-group lens construction where the lens groups are of negative and positive refractive power in order from the object side, the zoom lens system becomes asymmetric and aberration variations due to zooming become large, making it difficult to obtain favorable correction of aberrations across the entire range of zoom.

Examples of conventional two-group zoom lenses wherein the front lens group has negative refractive power and the rear lens group has positive refractive power are disclosed in Japanese Laid Open Patent Applications H9-171139 and H11-344670.

Although the lens system described in Japanese Laid Open Patent Application H9-171139 has an image angle of 100 degrees or more and thus is a wide-angle lens system, the second lens group has seven lens elements and the entire zoom lens includes as many as eleven lens elements, making it difficult to miniaturize the lens. On the other hand, although the lens system described in Japanese Laid Open Patent Application H11-344670 is easily miniaturized due to having only three lens elements in the first lens group and only eight lens elements overall, it is more difficult to favorably correct the various aberrations since there is less flexibility of design the fewer the number of lens elements. Further, because there are only two lens elements which provide the negative refractive power required in the front lens group, the curvatures of these lens elements must be relatively strong, causing the manufacturing costs for these lens elements to increase.

BRIEF SUMMARY OF THE INVENTION

The present invention is a zoom lens having an image angle 2ω of 100 degrees or more at the wide-angle end, and is especially useful in monitoring cameras. Also, the present invention may be used in various other kinds of video cameras and electronic still cameras which use a solid-state image detector, such as a CCD array, to record the image.

The object of the present invention is to provide a compact, wide-angle zoom lens which favorably corrects aberrations and is easy to manufacture while providing an angle of view at the wide-angle end of 100 degrees or more.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The wide-angle zoom lens of the present invention is formed of, in order from the object side, a first lens group having negative refractive power and a second lens group having positive refractive power. Zooming is performed by moving the first lens group and the second lens group along the optical axis. The first lens group is formed of, in order from the object side, a negative meniscus lens element with its convex surface on the object side, two negative lens elements, and a positive lens element. The second lens group is formed of, in order from the object side, two positive lens elements, a biconcave lens element, and two positive lens elements. Preferably, the following Conditions (1)–(3) are satisfied:

$0.43 < |f_1/f_2| < 0.85$ ... Condition (1)
$0.35 < f_{1N}/f_1 < 0.75$ ... Condition (2)
$0.30 < |m_{2W}| < 0.48$ ... Condition (3)

where
$f_1$ is the focal length of the first lens group,
$f_2$ is the focal length of the second lens group,
$f_{1N}$ is the composite focal length of the first three lens elements in the first lens group, in order from the object side, and
The following Conditions (4) and (5)

$m_{2W}$ is the lateral magnification of the second lens group, at the wide-angle end.

$$0.43 < |f_1/f_2| < 0.75 \quad \text{... Condition (4)}$$
$$0.8 < f_{f1f2}/f_1 < 1.4 \quad \text{... Condition (5)}$$

where $f_1$ and $f_2$ are defined above, and $f_{f1\,f2}$ is the composite focal length of the first two elements in the first lens group, in order from the object side.

Figure 1:
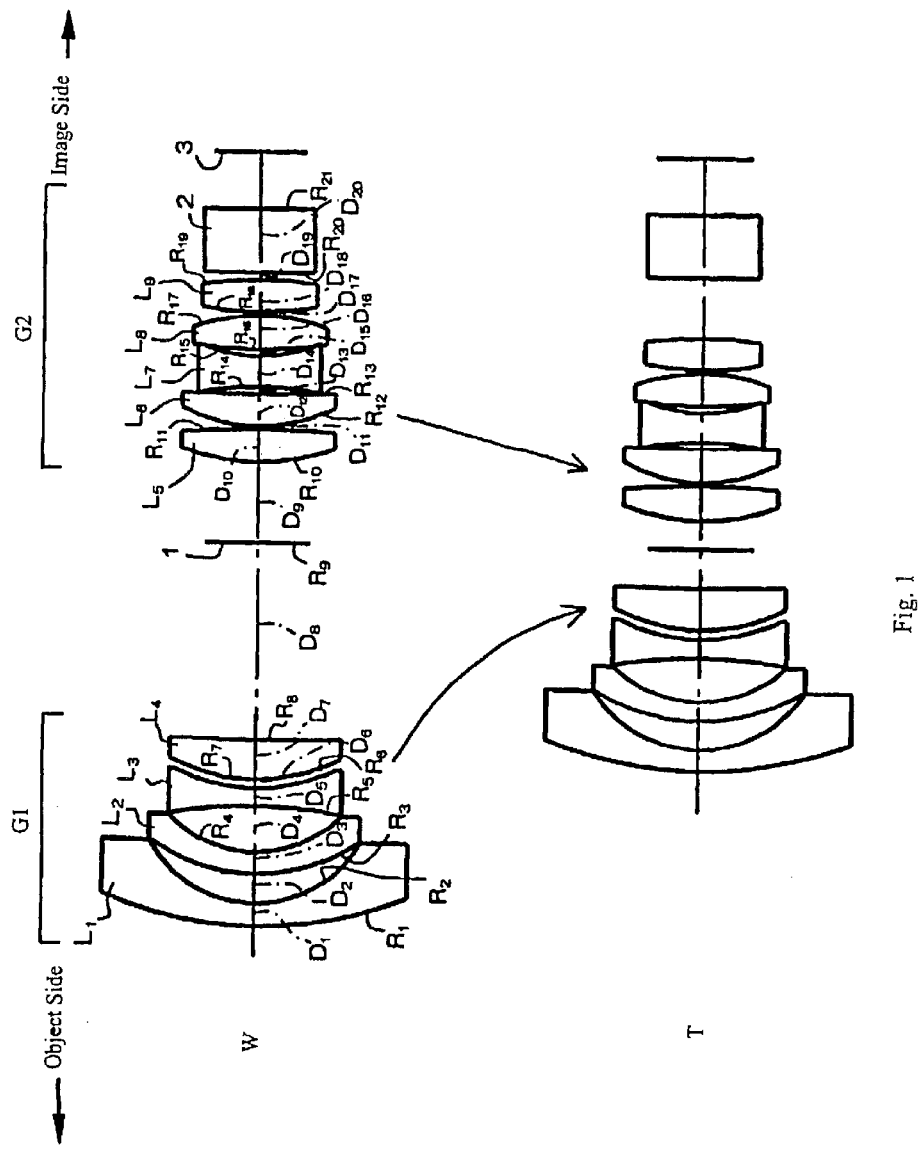
FIG. 1 shows the basic lens element configuration and lens group positions of a wide-angle zoom lens according to Embodiment 1 at both the wide-angle and telephoto ends;.

FIG. 1 shows the basic lens element configuration and lens group positions for Embodiment 1 of the present invention at both the wide-angle and telephoto ends. The wide-angle zoom lens of this embodiment has a construction in which the first lens group G1 is formed of four lens elements and the second lens group G2 is formed of five lens elements so as to provide a compact construction having nine lens elements overall. Also, a stop 1 is positioned between the first lens group G1 and the second lens group G2, and a filter unit 2 such as an infrared cutoff filter is positioned on the image side of the second lens group G2. Light flux from an object on the object side forms an image on the detecting surface of a solid-state image detector 3, such a CCD array.

When zooming, the first lens group G1 and the second lens group G2 move along the optical axis as indicated in FIG. 1. Focusing is performed by moving the first lens group G1 along the optical axis.

The purpose of each of the Conditions (1)–(3) will now be explained. Condition (1) is for appropriately setting the negative/positive power allocation of the first lens group G1 and the second lens group G2. If the lower limit of Condition (1) is not satisfied, because the required displacement of the second lens group G2 during zooming increases, the total length of the zoom lens will become too long to achieve a compact zoom lens. Also, the positive curvature of field becomes large, making its correction difficult. On the other hand, if the upper limit value is exceeded, the refractive power of the second lens group G2 becomes too strong, making it difficult to correct the negative spherical aberration occurring in the second lens group G2, and making a wide image angle difficult to achieve.

Condition (2) is for appropriately setting the power of the first three lens elements in the first lens group G1, in order from the object side. If the lower limit of Condition (2) is not satisfied, because the negative refractive power of the first lens group G1 becomes too strong, negative distortion at the wide-angle end becomes excessive, making its correction difficult. On the other hand, if the upper limit of Condition (2) is exceeded, the negative refractive power of the first lens group G1 becomes weak, and its front lens diameter increases, which is disadvantageous in making the zoom lens compact.

Condition (3) is for appropriately setting the range of the lateral magnification of the second lens group G2 at the wide-angle end. If the lower limit of Condition (3) is not satisfied, because the power of the second lens group G2 becomes too strong, negative spherical aberration becomes stronger, making its correction difficult. On the other hand, if the upper limit of Condition (3) is not satisfied, the displacement required of the second lens group G2 during zooming becomes large, causing the zoom lens to no longer be compact.

By satisfying Condition (4) in addition to Condition (1), achieving a sufficiently large, wide-angle view of at least 100° becomes easier. By also satisfying Condition (5), a wide-angle view of at least 115° (i.e., $2\omega \geq 115°$) at the wide-angle end is achieved while maintaining favorable correction of all aberrations.

Specific embodiments of the invention will now be discussed in detail.

Embodiment 1

The basic lens element configuration and group positions during zooming for the wide-angle zoom lens of Embodiment 1 are as shown in FIG. 1. The first lens group G1 is formed of, in sequential order from the object side, a first lens element $L_1$ and a second lens element $L_2$ each of which is a negative meniscus lens with its convex surface on the object side, a third lens element $L_3$ that is biconcave, and a fourth lens element $L_4$ that is a positive meniscus lens element with its convex surface on the object side.

The second lens group G2 is formed of, in sequential order from the object side, a fifth lens element $L_5$ that is biconvex, a sixth lens element $L_6$ that has a positive meniscus shape with its convex surface on the object side, a seventh lens element $L_7$ that is biconcave, and an eighth lens element $L_8$ and a ninth lens element $L_9$, each of which is biconvex.

Table 1 below lists the surface number # in order from the object side, the radius of curvature R (in mm) of each surface, the on-axis spacing D (in mm) between surfaces, as well as the index of refraction $N_d$ and Abbe number $\upsilon_d$ (both at the d line) of each optical element of Embodiment 1. In the middle portion of the table are listed the values for D8, D9 and D19 as well as the focal lengths f (in mm) and the F-numbers $F_{NO}$ for each zoom position corresponding to the wide-angle end W, the mid-position M, and the telephoto end T. In the bottom portion of the table are listed the values which correspond to the Conditions (1)–(5).

TABLE 1

| # | R | D | $N_d$ | $\upsilon_d$ |
|---|---|---|---|---|
| 1 | 20.99 | 1.19 | 1.77250 | 49.6 |
| 2 | 6.34 | 1.56 | | |
| 3 | 9.78 | 1.07 | 1.77250 | 49.6 |
| 4 | 6.30 | 2.41 | | |
| 5 | −24.20 | 0.94 | 1.71299 | 53.8 |
| 6 | 9.23 | 0.49 | | |
| 7 | 9.50 | 2.17 | 1.84665 | 23.8 |
| 8 | 123.23 | D8 (variable) | | |
| 9 | ∞ (stop) | D9 (variable) | | |
| 10 | 11.20 | 1.84 | 1.80609 | 40.9 |
| 11 | −47.35 | 0.16 | | |
| 12 | 8.20 | 1.81 | 1.62041 | 60.3 |
| 13 | 171.90 | 0.38 | | |
| 14 | −14.16 | 1.60 | 1.84665 | 23.8 |
| 15 | 7.26 | 0.39 | | |
| 16 | 21.36 | 1.78 | 1.62041 | 60.3 |
| 17 | −10.03 | 0.17 | | |
| 18 | 15.61 | 1.72 | 1.69679 | 55.5 |
| 19 | −20.03 | D19 (variable) | | |
| 20 | ∞ | 3.32 | 1.51680 | 64.2 |
| 21 | ∞ | | | |

| | W | M | T |
|---|---|---|---|
| D8 | 10.53 | 4.43 | 2.07 |
| D9 | 4.27 | 2.89 | 1.50 |
| D19 | 3.44 | 4.83 | 6.21 |
| f | 2.29 | 3.43 | 4.58 |
| $F_{NO}$ | 1.46 | 1.60 | 1.83 |

| Condition (1), (4) value: | $|f_1/f_2|$ | = | 0.83 |
|---|---|---|---|
| Condition (2) value: | $f_{IN}/f_1$ | = | 0.53 |

TABLE 1-continued

| Condition (3) value: | $|m_{2w}|$ | = | 0.35 |
| Condition (5) value | $f_{f1f2}/f_1$ | = | 1.18 |

Figure 2A:
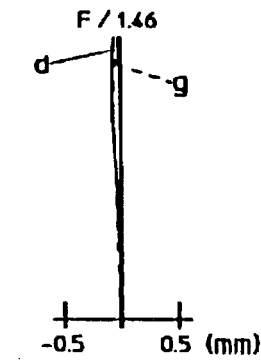
FIGS. 2A, 2B and 2C show the spherical aberration, astigmatism, and distortion, respectively, for Embodiment 1 at the wide-angle end.
Figure 2B:
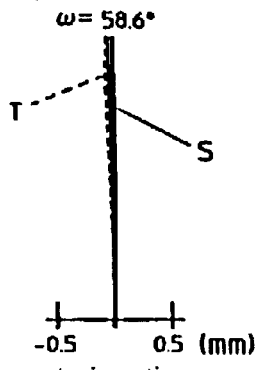
Figure 2C:
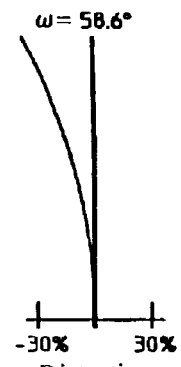
Figure 2D:
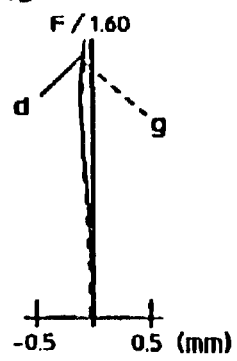
FIGS. 2D, 2E and 2F show the spherical aberration, astigmatism, and distortion, respectively, for Embodiment 1 at the mid position.
Figure 2E:
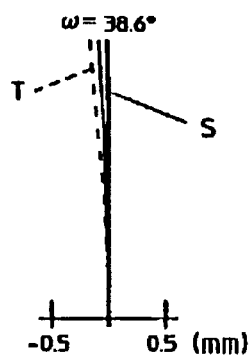
Figure 2F:
Figure 2G:
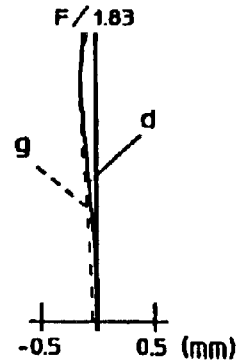
FIGS. 2G, 2H, and 2I show the spherical aberration, astigmatism, and distortion, respectively, for Embodiment 1 at the telephoto end.
Figure 2H:
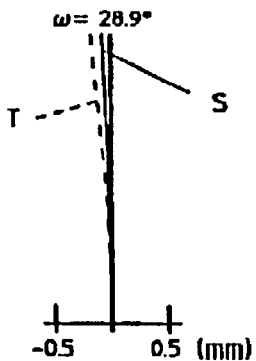
Figure 2I:

FIGS. 2A, 2B and 2C show the spherical aberration, astigmatism, and distortion, respectively, for this embodiment at the wide-angle end (f=2.29 mm), FIGS. 2D, 2E and 2F show the spherical aberration, astigmatism, and distortion, respectively, at the mid position (f=3.43 mm), and FIGS. 2G, 2H, and 2I show the spherical aberration, astigmatism, and distortion, respectively, at the telephoto end (f=4.58 mm). In these aberration plots ω is the half-image angle. The spherical aberration is shown for both the d and g lines, and the astigmatism is shown for both the sagittal S and tangential T image planes.

Thus, as is apparent from comparing the data of Table 1 with the Conditions (1)–(5), the zoom lens of Embodiment 1 satisfies each of the Conditions (1)–(5), and the F numbers lie in the range 1.46–1.83 so as to provide a bright image. Further, as is apparent from FIGS. 2A–2I, the image angle 2ω is 117.2° at the wide-angle end and each of the various aberrations is favorably corrected throughout the range of zoom.

Embodiment 2

Although the construction of the wide-angle zoom lens relating to Embodiment 2 is basically the same as in Embodiment 1, it is different in that the second lens element $L_2$ of the first lens group G1 is a biconcave lens, and the third lens element $L_3$ is a negative meniscus lens with its convex surface on the object side.

Table 2 below lists the surface number # in order from the object side, the radius of curvature R (in mm) of each surface, the on-axis spacing D (in mm) between surfaces, as well as the index of refraction $N_d$ and Abbe number $\upsilon_d$ (both at the d line) of each optical element of Embodiment 2. In the middle portion of the table are listed the values for D8, D9 and D19 as well as the focal lengths f (in mm) and the F-numbers $F_{NO}$ for each zoom position corresponding to the wide-angle end W, the mid-position M, and the telephoto end T. In the bottom portion of the table are listed the values which correspond to the Conditions (1)–(5).

TABLE 2

| # | R | D | $N_d$ | $\upsilon_d$ |
|---|---|---|---|---|
| 1 | 15.08 | 1.00 | 1.77250 | 49.6 |
| 2 | 5.80 | 4.35 | | |
| 3 | −147.74 | 2.00 | 1.77250 | 49.6 |
| 4 | 12.98 | 0.83 | | |
| 5 | 16.72 | 2.00 | 1.71299 | 53.8 |
| 6 | 7.28 | 0.97 | | |
| 7 | 7.53 | 2.76 | 1.84665 | 23.8 |
| 8 | 11.53 | D8 (variable) | | |
| 9 | ∞ (stop) | D9 (variable) | | |
| 10 | 15.14 | 1.94 | 1.80400 | 46.6 |
| 11 | −30.23 | 0.15 | | |
| 12 | 7.59 | 2.46 | 1.62041 | 60.3 |
| 13 | 29.83 | 0.61 | | |
| 14 | −20.56 | 2.50 | 1.84665 | 23.8 |
| 15 | 7.06 | 0.41 | | |
| 16 | 20.15 | 1.71 | 1.62041 | 60.3 |
| 17 | −13.54 | 0.16 | | |
| 18 | 10.05 | 1.81 | 1.69679 | 55.5 |
| 19 | −37.76 | D19 (variable) | | |
| 20 | ∞ | 3.32 | 1.51680 | 64.2 |
| 21 | ∞ | | | |

TABLE 2-continued

| | W | M | T |
|---|---|---|---|
| D8 | 8.18 | 3.59 | 2.23 |
| D9 | 5.42 | 3.55 | 1.67 |
| D19 | 3.45 | 5.33 | 7.21 |
| f | 2.24 | 3.36 | 4.48 |
| $F_{NO}$ | 1.45 | 1.64 | 1.97 |

| Condition (1), (4) value: | $|f_1/f_2|$ | = | 0.60 |
| Condition (2) value: | $f_{1N}/f_1$ | = | 0.74 |
| Condition (3) value: | $|m_{2w}|$ | = | 0.44 |
| Condition (5) value | $f_{f1f2}/f_1$ | = | 1.16 |

Figure 3A:
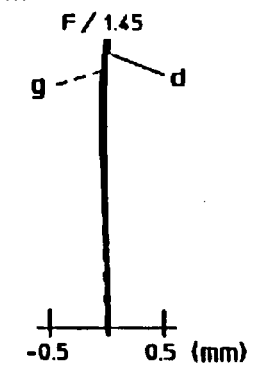
FIGS. 3A, 3B and 3C show the spherical aberration, astigmatism, and distortion, respectively, for Embodiment 2 at the wide-angle end.
Figure 3B:
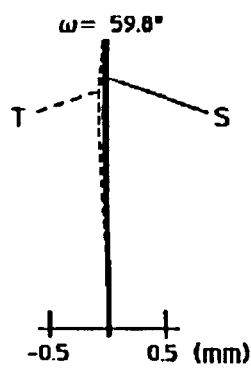
Figure 3C:
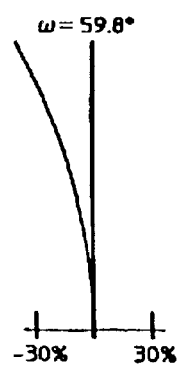
Figure 3D:
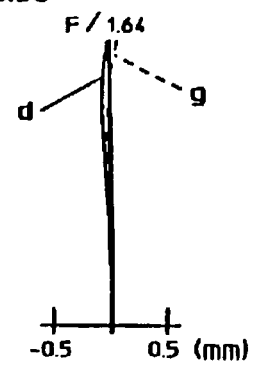
FIGS. 3D, 3E and 3F show the spherical aberration, astigmatism, and distortion, respectively, for Embodiment 2 at the mid position.
Figure 3E:
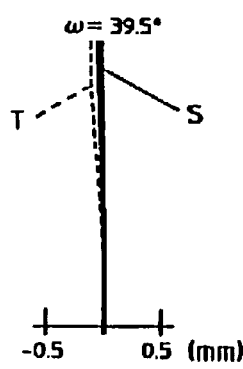
Figure 3F:
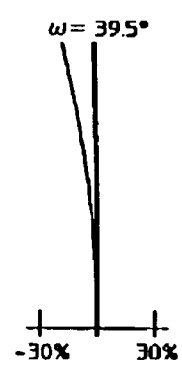
Figure 3G:
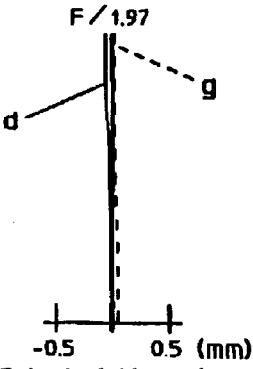
FIGS. 3G, 3H, and 3I show the spherical aberration, astigmatism, and distortion, respectively, for Embodiment 2 at the telephoto end.
Figure 3H:
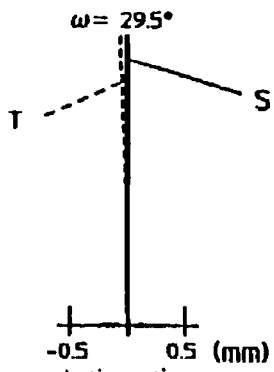
Figure 3I:

FIGS. 3A, 3B and 3C show the spherical aberration, astigmatism, and distortion, respectively, for this embodiment at the wide-angle end (f=2.24 mm), FIGS. 3D, 3E and 3F show the spherical aberration, astigmatism, and distortion, respectively, at the mid position (f=3.36 mm), and FIGS. 3G, 3H, and 3I show the spherical aberration, astigmatism, and distortion, respectively, at the telephoto end (f=4.48 mm). In these aberration plots ω is the half-image angle. The spherical aberration is shown for both the d and g lines, and the astigmatism is shown for both the sagittal S and tangential T image planes.

Thus, as is apparent from comparing the data of Table 2 with the Conditions (1)–(5), the zoom lens of Embodiment 2 satisfies each of the Conditions (1)–(5), and the F numbers lie in the range 1.45–1.97 so as to provide a bright image. Further, as is apparent from FIGS. 3A–3I, the image angle 2ω is 119.6° at the wide-angle end and each of the various aberrations is favorably corrected throughout the range of zoom.

Embodiment 3

The basic lens element configuration of the wide-angle zoom lens of Embodiment 3 is similar to that of Embodiment 1, except in this embodiment the fourth lens element $L_4$ of the first lens group G1, as well as the sixth lens element $L_6$ of the second lens group G2, are biconvex.

Table 3 below lists the surface number # in order from the object side, the radius of curvature R (in mm) of each surface, the on-axis spacing D (in mm) between surfaces, as well as the index of refraction $N_d$ and Abbe number $\upsilon_d$ (both at the d line) of each optical element of Embodiment 3. In the middle portion of the table are listed the values for D8, D9 and D19 as well as the focal lengths f (in mm) and the F-numbers $F_{NO}$ for each zoom position corresponding to the wide-angle end W, the mid-position M, and the telephoto end T. In the bottom portion of the table are listed the values which correspond to the Conditions (1)–(5).

TABLE 3

| # | R | D | $N_d$ | $\upsilon_d$ |
|---|---|---|---|---|
| 1 | 20.89 | 1.05 | 1.77250 | 49.6 |
| 2 | 7.17 | 3.19 | | |
| 3 | 36.93 | 1.97 | 1.77250 | 49.6 |
| 4 | 8.45 | 2.23 | | |
| 5 | −9.60 | 0.93 | 1.71736 | 29.5 |
| 6 | 13.64 | 0.47 | | |
| 7 | 16.70 | 2.54 | 1.84665 | 23.8 |
| 8 | −14.69 | D8 (variable) | | |
| 9 | ∞ (stop) | D9 (variable) | | |
| 10 | 18.56 | 1.84 | 1.80439 | 39.6 |

TABLE 3-continued

| | | | | |
|---|---|---|---|---|
| 11 | −60.26 | 1.97 | | |
| 12 | 8.55 | 2.76 | 1.62041 | 60.3 |
| 13 | −48.53 | 0.39 | | |
| 14 | −17.74 | 2.98 | 1.84665 | 23.8 |
| 15 | 7.27 | 0.39 | | |
| 16 | 13.93 | 1.80 | 1.62041 | 60.3 |
| 17 | −17.80 | 0.18 | | |
| 18 | 20.52 | 1.93 | 1.69679 | 55.5 |
| 19 | −17.92 | D19 (variable) | | |
| 20 | ∞ | 3.32 | 1.51680 | 64.2 |
| 21 | ∞ | | | |

| | W | T | M |
|---|---|---|---|
| D8 | 15.01 | 5.93 | 2.21 |
| D9 | 4.89 | 3.26 | 1.63 |
| D19 | 3.49 | 5.12 | 6.76 |
| f | 2.29 | 3.44 | 4.59 |
| $F_{NO}$ | 1.45 | 1.56 | 1.76 |

| | | | |
|---|---|---|---|
| Condition (1), (4) value: | $|f_1/f_2|$ | = | 0.70 |
| Condition (2) value: | $f_{IN}/f_1$ | = | 0.38 |
| Condition (3) value: | $|m_{2w}|$ | = | 0.32 |
| Condition (5) value | $f_{f1f2}/f_1$ | = | 0.88 |

Figure 4A:
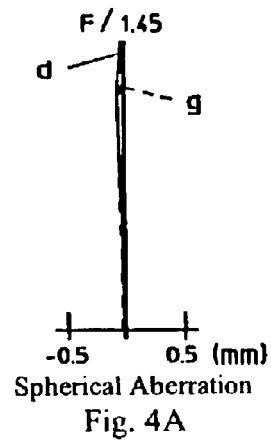
FIGS. 4A, 4B and 4C show the spherical aberration, astigmatism, and distortion, respectively, for Embodiment 3 at the wide-angle end.
Figure 4B:
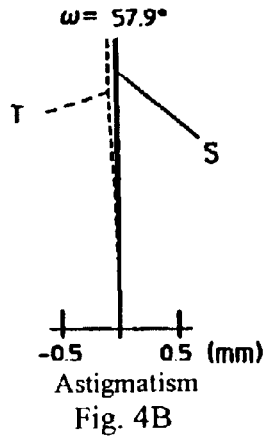
Figure 4C:
Figure 4D:
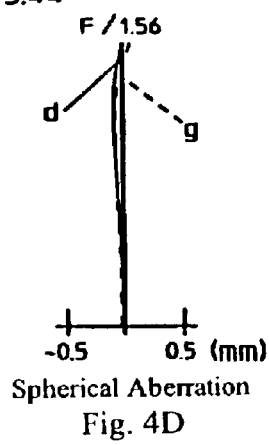
FIGS. 4D, 4E and 4F show the spherical aberration, astigmatism, and distortion, respectively, for Embodiment 3 at the mid position.
Figure 4E:
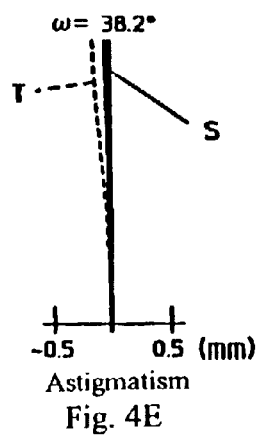
Figure 4F:
Figure 4G:
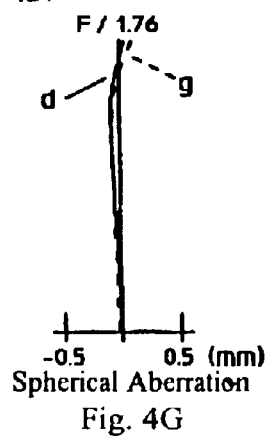
FIGS. 4G, 4H, and 4I show the spherical aberration, astigmatism, and distortion, respectively, for Embodiment 3 at the telephoto end.
Figure 4H:
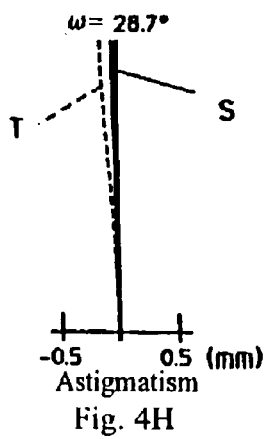
Figure 4I:

FIGS. 4A, 4B and 4C show the spherical aberration, astigmatism, and distortion, respectively, for this embodiment at the wide-angle end (f=2.29 mm), FIGS. 4D, 4E and 4F show the spherical aberration, astigmatism, and distortion, respectively, at the mid position (f=3.44 mm), and FIGS. 4G, 4H, and 4I show the spherical aberration, astigmatism, and distortion, respectively, at the telephoto end (f=4.59 mm). In these aberration plots ω indicates the half-image angle. The spherical aberration is shown for both the d and g lines, and the astigmatism is shown for both the sagittal S and tangential T image planes.

Thus, as is apparent from comparing the data of Table 3 with the Conditions (1)–(5), the zoom lens of Embodiment 3 satisfies each of the Conditions (1)–(5), and the F numbers lie in the range 1.45–1.76 so as to provide a bright image. Further, as is apparent from FIGS. 4A–4I, the image angle 2ω is 115.8° at the wide-angle end and each of the various aberrations is favorably corrected throughout the range of zoom.

Embodiment 4

The basic lens element configuration of the wide-angle zoom lens of Embodiment 4 is similar to that of Embodiment 2.

Table 4 below lists the surface number # in order from the object side, the radius of curvature R (in mm) of each surface, the on-axis spacing D (in mm) between surfaces, as well as the index of refraction $N_d$ and Abbe number $v_d$ (both at the d line) of each optical element of Embodiment 4. In the middle portion of the table are listed the values for D8, D9 and D19 as well as the focal lengths f (in mm) and the F-numbers $F_{NO}$ for each zoom position corresponding to the wide-angle end W, the mid-position M, and the telephoto end T. In the bottom portion of the table are listed the values which correspond to the Conditions (1)–(5).

TABLE 4

| # | R | D | $N_d$ | $v_d$ |
|---|---|---|---|---|
| 1 | 17.82 | 1.00 | 1.80400 | 46.6 |
| 2 | 6.16 | 4.12 | | |
| 3 | −75.43 | 2.00 | 1.80400 | 46.6 |
| 4 | 13.10 | 1.36 | | |
| 5 | 136.78 | 2.00 | 1.71299 | 53.8 |
| 6 | 9.21 | 0.55 | | |
| 7 | 10.24 | 2.00 | 1.84665 | 23.8 |
| 8 | 40.90 | D8 (variable) | | |
| 9 | ∞ (stop) | D9 (variable) | | |
| 10 | 17.51 | 2.18 | 1.80400 | 46.6 |
| 11 | −29.62 | 0.42 | | |
| 12 | 8.92 | 2.73 | 1.62041 | 60.3 |
| 13 | 59.98 | 0.63 | | |
| 14 | −25.08 | 3.00 | 1.84665 | 23.8 |
| 15 | 7.28 | 0.43 | | |
| 16 | 13.47 | 2.93 | 1.62041 | 60.3 |
| 17 | −19.72 | 1.50 | | |
| 18 | 14.10 | 1.73 | 1.69679 | 55.5 |
| 19 | −36.39 | D19 (variable) | | |
| 20 | ∞ | 3.32 | 1.51680 | 64.2 |
| 21 | ∞ | | | |

| | W | M | T |
|---|---|---|---|
| D8 | 11.21 | 5.33 | 3.56 |
| D9 | 6.39 | 4.03 | 1.67 |
| D19 | 3.06 | 5.42 | 7.78 |
| f | 2.23 | 3.34 | 4.46 |
| $F_{NO}$ | 1.45 | 1.62 | 1.94 |

| | | | |
|---|---|---|---|
| Condition (1), (4) value: | $|f_1/f_2|$ | = | 0.47 |
| Condition (2) value: | $f_{IN}/f_1$ | = | 0.61 |
| Condition (3) value: | $|m_{2w}|$ | = | 0.44 |
| Condition (5) value | $f_{f1f2}/f_1$ | = | 1.07 |

Figure 5A:
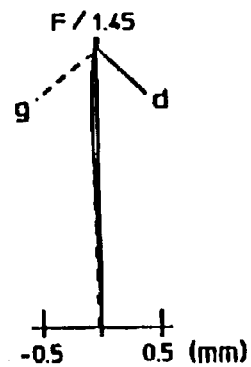
FIGS. 5A, 5B and 5C show the spherical aberration, astigmatism, and distortion, respectively, for Embodiment 4 at the wide-angle end.
Figure 5B:
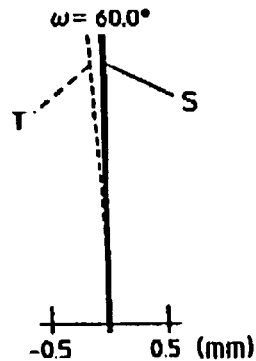
Figure 5C:
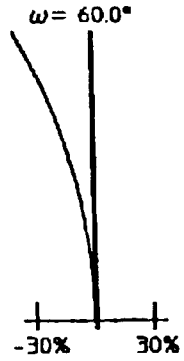
Figure 5D:
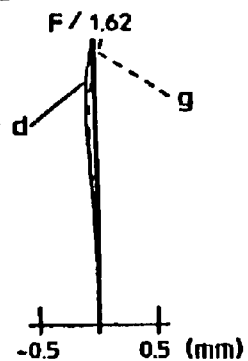
FIGS. 5D, 5E and 5F show the spherical aberration, astigmatism, and distortion, respectively, for Embodiment 4 at the mid position.
Figure 5E:
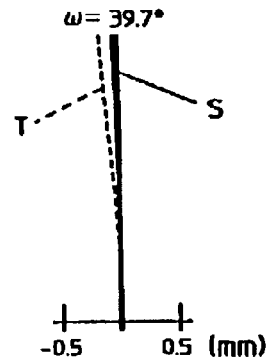
Figure 5F:
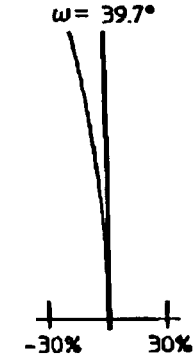
Figure 5G:
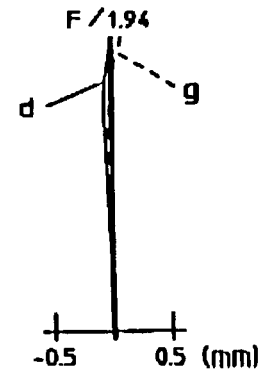
FIGS. 5G, 5H, and 5I show the spherical aberration, astigmatism, and distortion, respectively, for Embodiment 4 at the telephoto end.
Figure 5H:
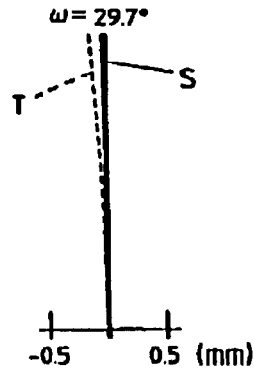
Figure 5I:

FIGS. 5A, 5B and 5C show the spherical aberration, astigmatism, and distortion, respectively, for this embodiment at the wide-angle end (f=2.23 mm), FIGS. 5D, 5E and 5F show the spherical aberration, astigmatism, and distortion, respectively, at the mid position (f=3.34 mm), and FIGS. 5G, 5H, and 5I show the spherical aberration, astigmatism, and distortion, respectively, at the telephoto end (f=4.46 mm). In these aberration plots ω is the half-image angle. The spherical aberration is shown for both the d and g lines, and the astigmatism is shown for both the sagittal S and tangential T image planes.

Thus, as is apparent from comparing the data of Table 4 with the Conditions (1)–(5), the zoom lens of Embodiment 4 satisfies each of the Conditions (1)–(5), and the F numbers lie in the range 1.45–1.94 so as to provide a bright image. Further, as is apparent from FIGS. 5A–5I, the image angle 2ω is 120.0° at the wide-angle end and each of the various aberrations is favorably corrected throughout the entire range of zoom.

Thus, the present invention provides a two-group zoom lens which has an image angle 2ω at the wide-angle end that far exceeds 100°, is compact, provides a high quality image over the entire range of zoom, and is easy to manufacture.

The invention being thus described, it will be obvious that the same may be varied in many ways. For example, the radii of curvature R and surface spacings D may be readily scaled to achieve a zoom lens having a different range of zoom, and the different optical materials may be used for the lens elements. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A wide-angle zoom lens having only two lens groups, of negative and positive refractive power, respectively, in order from the object side, wherein zooming is performed by moving the first lens group and the second lens group along the optical axis, the first lens group is formed of, in sequential order from the object side, a negative meniscus lens element with its convex surface on the object side, two negative lens elements, and a positive lens element;

the second lens group is formed of, in sequential order from the object side, two positive lens elements, a biconcave lens element, and two positive lens elements; and the following conditions are satisfied:

$0.43 < |f_1/f_2| < 0.85$ $0.35 < f_{1N}/f_1 < 0.75$ $0.30 < |m_{2W}| < 0.48$ where $f_1$ is the focal length of the first lens group, $f_2$ is the focal length of the second lens group, $f_{1N}$ is the composite focal length of the first three lens elements in the first lens group, in order from the object side, and $m_{2W}$ is the longitudinal magnification of the second lens group, at the wide-angle end.

2. The wide-angle zoom lens as described in claim 1, wherein the following condition is also satisfied:

$0.43 < |f_1/f_2| < 0.75$.

3. The wide-angle zoom lens as described in claim 1, wherein the following condition is also satisfied:

$0.8 < f_{f1f2}/f_1 < 1.4$ where $f_{f1f2}$ is the composite focal length of the first two lens elements of the first lens group, in order from the object side.

4. A wide-angle zoom lens having only two lens groups, of negative and positive refractive power, respectively, in order from the object side, wherein:

zooming is performed by moving the first lens group and the second lens group along the optical axis;

the first lens group is formed of, in sequential order from the object side, a negative meniscus lens element with its convex surface on the object side, two negative lens elements, and a positive lens element;

the second lens group is formed of, in sequential order from the object side without any intervening lens element, two positive lens elements, a biconcave lens element, and two positive lens elements; and the following condition is satisfied:

$0.43 < |f_1/f_2| < 0.85$ where $f_1$ is the focal length of the first lens group, and $f_2$ is the focal length of the second lens group.

5. A wide-angle zoom lens having only two lens groups, of negative and positive refractive power, respectively, in order from the object side, wherein:

zooming is performed by moving the first lens group and the second lens group along the optical axis;

the first lens group is formed of, in sequential order from the object side, a negative meniscus lens element with its convex surface on the object side, two negative lens elements, and a positive lens element;

the second lens group is formed of, in sequential order from the object side, without any intervening lens element, two positive lens elements, a biconcave lens element, and two positive lens elements; and the following condition is satisfied:

$0.30 < |m_{2W}| < 0.48$ where $m_{2W}$ is the lateral magnification of the second lens group at the wide-angle end.

6. The wide-angle zoom lens having only two lens groups, of negative and positive refractive power, respectively, in order from the object side, wherein:

zooming is performed by moving the first lens group and the second lens group along the optical axis;

the first lens group is formed of, in sequential order from the object side, a negative meniscus lens element with its convex surface on the object side, two negative lens elements, and a positive lens element;

the second lens group is formed of, in sequential order from the object side, two positive lens elements, a biconcave lens element, a positive lens element adjacent the biconcave lens element, and a positive lens element; and the following condition is satisfied $0.43 < |f_1/f_2| < 0.85$ where $f_1$ is the focal length of the first lens group, and $f_2$ is the focal length of the second lens group.

7. The wide-angle zoom lens having only two lens groups, of negative and positive refractive power, respectively, in order from the object side, wherein:

zooming is performed by moving the first lens group and the second lens group along the optical axis;

the first group is formed of, in sequential order from the object side, a negative meniscus lens element with its convex surface on the object side, two negative lens elements, and a positive lens element;

the second lens group is formed of, in sequential order from the object side, two positive lens elements, a biconcave lens element, a positive lens element adjacent the biconcave lens element, and a positive lens element; and the following condition is satisfied $0.30 < |m_{2W}| < 0.48$ where $m_{2W}$ is the lateral magnification of the second lens group at the wide-angle end.

* * * * *

UNITED STATES PATENT AND TRADEMARK OFFICE
CERTIFICATE OF CORRECTION

PATENT NO. : 6,809,882 B2
DATED : October 26, 2004
INVENTOR(S) : Takatsuki

It is certified that error appears in the above-identified patent and that said Letters Patent is hereby corrected as shown below:

Column 2,
Line 67, before "The following" insert -- $m_{2w}$ is the lateral magnification of the second lens group, at the wide-angle end. --;
Line 68, after "Conditions (4) and (5)" insert -- should, perferably, also be satisfied: --;

Column 3,
Lines 1 and 2, delete "$m_{2w}$ is the lateral magnification of the second lens group, at the wide-angle end."

Column 4,
Line 33, change "$F_{NO}$" to -- $F_{NO}$ --;

Column 5,
Line 43, change "$F_{NO}$" to -- $F_{NO}$ --;

Column 6,
Line 51, change "$F_{NO}$" to -- $F_{NO}$ --;

Column 7,
Line 57, change "$F_{NO}$" to -- $F_{NO}$ --; and

Column 10,
Line 8, change "object side, without" to -- object side without --.

Signed and Sealed this

First Day of February, 2005

JON W. DUDAS
*Director of the United States Patent and Trademark Office*